(12) United States Patent
Brunnquell et al.

(10) Patent No.: US 11,787,586 B2
(45) Date of Patent: Oct. 17, 2023

(54) HOUSED LINE FOR PROCESSING AND PACKAGING FOOD

(71) Applicant: GEA Food Solutions Germany GmbH, Biedenkopf-Wallau (DE)

(72) Inventors: Norbert Brunnquell, Altusried (DE); Schaafhausen Wilfried, Friedrichshafen (DE)

(73) Assignee: GEA Food Solutions Germany GmbH, Biedenkopf-Wallau (DE)

( * ) Notice: Subject to any disclaimer, the term of this patent is extended or adjusted under 35 U.S.C. 154(b) by 0 days.

(21) Appl. No.: 17/046,453

(22) PCT Filed: Apr. 10, 2019

(86) PCT No.: PCT/EP2019/059028
§ 371 (c)(1),
(2) Date: Oct. 9, 2020

(87) PCT Pub. No.: WO2019/197439
PCT Pub. Date: Oct. 17, 2019

(65) Prior Publication Data
US 2021/0155359 A1 May 27, 2021

(30) Foreign Application Priority Data
Apr. 10, 2018 (DE) ...................... 10 2018 205 380.4

(51) Int. Cl.
*B65B 65/00* (2006.01)
*B65B 25/06* (2006.01)
(Continued)

(52) U.S. Cl.
CPC ............ *B65B 65/003* (2013.01); *A23L 3/001* (2013.01); *A23L 3/28* (2013.01); *A23L 3/3418* (2013.01);
(Continued)

(58) Field of Classification Search
CPC ....... B65B 25/04; B65B 25/041; B65B 25/06; B65B 25/062; B65B 25/065;
(Continued)

(56) References Cited

U.S. PATENT DOCUMENTS 1,848,827 A * 3/1932 Fink et al. ......... B21D 51/2692
53/76
3,587,203 A * 6/1971 Miles ..................... A23N 15/00
99/484

(Continued)

FOREIGN PATENT DOCUMENTS

DE 19525740 A1 1/1997
DE 102011056293 A1 * 6/2013 ............... B65C 9/02
(Continued)

OTHER PUBLICATIONS

International Search Report and Written Opinion for International Application PCT/EP2019/059028, dated Aug. 9, 2019.
(Continued)

*Primary Examiner* — Stephen F. Gerrity
(74) *Attorney, Agent, or Firm* — The Dobrusin Law Firm, P.C.

(57) ABSTRACT

A line for processing and packaging food. The line has at least one processing station for processing the food and at least one packaging station for packaging the processed food. The processing station and the packaging station are housed in an interior of a common housing.

23 Claims, 1 Drawing Sheet

(51) Int. Cl.
  *B65B 31/02* (2006.01)
  *B65B 55/02* (2006.01)
  *A23L 3/00* (2006.01)
  *A23L 3/28* (2006.01)
  *A23L 3/3418* (2006.01)

(52) U.S. Cl.
  CPC .............. *B65B 25/06* (2013.01); *B65B 31/02* (2013.01); *B65B 55/027* (2013.01)

(58) Field of Classification Search
  CPC ..... B65B 25/067; B65B 25/068; B65B 31/02; B65B 55/027; B65B 65/003; B65B 2210/06
  See application file for complete search history.

(56) References Cited

U.S. PATENT DOCUMENTS

| | | | | |
|---|---|---|---|---|
| 3,891,779 | A * | 6/1975 | Robinson | A23L 3/02 426/399 |
| 4,637,196 | A * | 1/1987 | Berner et al. | F16P 1/02 312/138.1 |
| 4,646,629 | A * | 3/1987 | Creed et al. | A23L 3/02 99/468 |
| 5,016,688 | A * | 5/1991 | Suzuki et al. | C12M 29/00 53/425 |
| 8,863,790 | B2 * | 10/2014 | Ziegler et al. | B65B 55/08 141/69 |
| 2003/0008605 | A1 * | 1/2003 | Hartford, Jr. et al. | A22C 18/00 452/198 |
| 2003/0047087 | A1 * | 3/2003 | Phebus et al. | A23B 4/12 99/516 |
| 2012/0192526 | A1 * | 8/2012 | Spix et al. | B65B 25/065 53/396 |
| 2014/0260099 | A1 * | 9/2014 | Braum et al. | B65B 55/027 53/510 |
| 2015/0152660 | A1 * | 6/2015 | Garrett et al. | B26D 1/01 52/234 |
| 2015/0230492 | A1 * | 8/2015 | Day, Jr. | B65B 29/00 426/232 |
| 2016/0050946 | A1 * | 2/2016 | Childs | A23L 3/3418 99/451 |
| 2017/0030097 | A1 * | 2/2017 | Marinoni | E04H 5/02 |
| 2017/0370599 | A1 * | 12/2017 | Marinoni | B01D 46/56 |
| 2020/0136856 | A1 * | 4/2020 | Ehrmann et al. | B65B 59/04 |

FOREIGN PATENT DOCUMENTS

| | | | | |
|---|---|---|---|---|
| EP | 253648 | A2 * | 1/1988 | ........... B65B 25/041 |
| EP | 1440886 | A1 * | 7/2004 | ............. B65B 19/28 |
| EP | 1167203 | B1 * | 10/2005 | ........... B65B 25/041 |
| FR | 2624475 | A * | 6/1989 | ........... B65B 25/041 |
| JP | 09070283 | A * | 3/1997 | |
| JP | H10229775 | A * | 9/1998 | |
| KR | 101535997 | B1 * | 7/2015 | .............. A22C 18/00 |
| KR | 20150093021 | A * | 8/2015 | .............. A22C 18/00 |
| WO | 2008/037326 | A2 | 4/2008 | |
| WO | WO-2018014083 | A1 * | 1/2018 | ........... B65B 25/041 |

OTHER PUBLICATIONS

International Preliminary Report on Patentability for International Application No. PCT/EP2019/059028, dated Jul. 10, 2020.

* cited by examiner

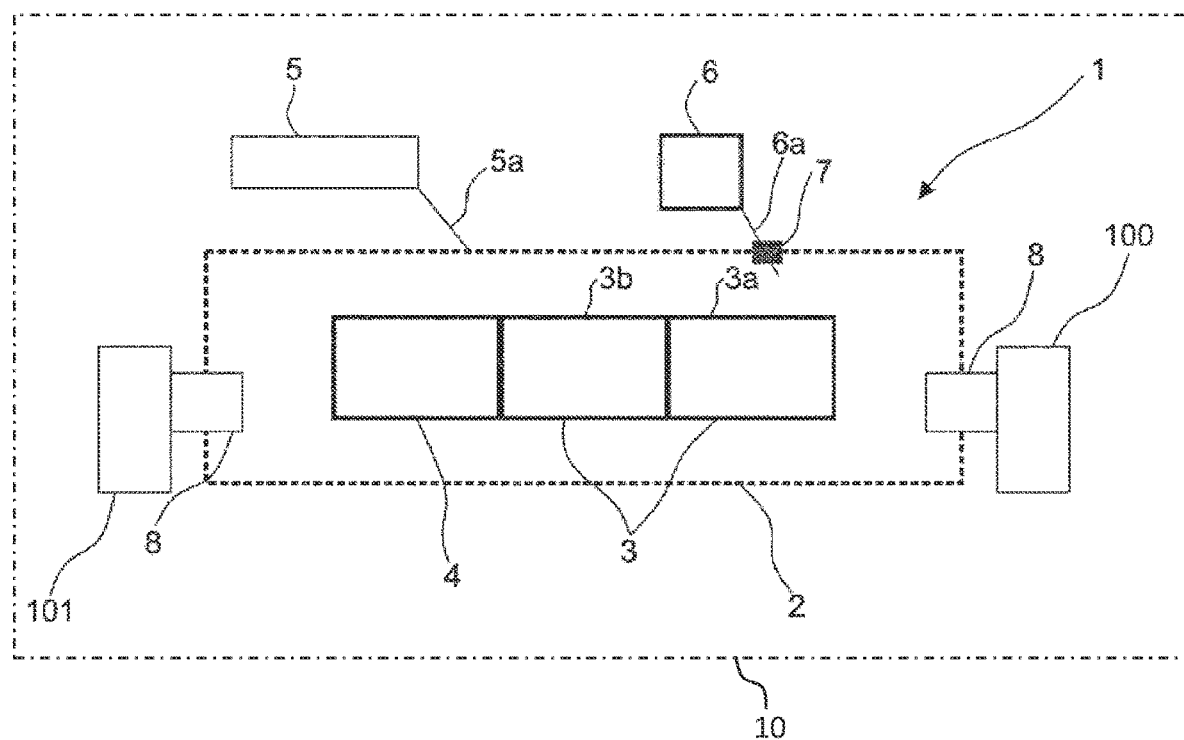

HOUSED LINE FOR PROCESSING AND PACKAGING FOOD

CROSS-REFERENCE TO RELATED APPLICATIONS

This application is a US National Stage Entry of PCT/EP2019/059028 filed on Apr. 10, 2019 and which claims priority to DE 10 2018 205 380.4 filed on Apr. 10, 2018, all of which are incorporated by reference herein for all purposes.

FIELD

The invention is based on a line for processing and packaging food.

BACKGROUND

Such lines conventionally process food in the form of blocks of food in processing stations. This especially comprises the slicing of the blocks of food into food slices in slicing devices, for example in high performance slicers. Furthermore, the processing conventionally comprises the sorting and combining of the food slices into individual portions or combined portions and finally into format sets in suitable devices in order accordingly to package the food in a packaging station.

A line thus has a multiplicity of different devices which are conventionally found in a production hall. In order to ensure good food quality with a high standard of hygiene, according to the prior art the production hall is cooled and has to be regularly intensively cleaned. The production hall here is at least a "medium-care" or else a "high-care" region. In addition, the employees have to enter the production hall through hygiene airlocks and have to wear suitable protective garments.

The low temperatures in the production hall are a reason for high rates of sickness among the employees in food production. Continuously working at low temperatures causes colds, joint problems, respiratory illnesses and much more. Furthermore, the cooling and the complicated cleaning of the production hall and also the use of protective garments cause high costs.

Furthermore, all of the devices of the line are conventionally closed individually with housings. The housings of the devices have to be laboriously removed for the maintenance and repair of the devices.

SUMMARY

It is an object of the present invention to avoid the disadvantages mentioned in conjunction with the prior art and to provide a line for processing and packaging food, which permits a pleasant ambient temperature in the production hall, the ambient temperature placing significantly lower demands on the hygiene in the production hall and simplifying maintenance and repair of the devices of the line.

The object of the present invention is achieved by a line for processing and packaging food, wherein the line has at least one processing station for processing the food and at least one packaging station for packaging the processed food, characterized in that the processing station and the packaging station are housed in an interior of a common housing.

The line according to the invention permits a changed cooling and hygiene concept. The housing of the processing station and of the packaging station makes it possible for only the interior to be kept at a temperature which is not harmful to the food being processed. Furthermore, the housing permits the hygienic separation between a—small—region having high hygienic requirements, i.e. the interior of the housing, and a region having lower hygienic requirements, i.e. the production hall outside the housing.

Within the context of the present invention, housed in the interior of the housing means that the interior of the housing is closed off from the production hall. Closed off means here that the interior of the housing is separated by walls, floors or similar parts from the part of the production hall that does not belong to the interior of the housing. The walls, floors or similar parts may be parts of the housing. However, it is also conceivable that the separation between interior and the parts of the production hall that do not belong to the interior is at least partially undertaken by means which are not parts of the housing. These may be, for example, the flooring of the production hall or else parts of the packaging station or parts of the processing station. The interior is preferably closed off in a gas- and liquid-tight manner.

It is conceivable for the line to be arranged in a production hall.

It is conceivable for the housing to have a frame. The frame is preferably manufactured from a metal. Furthermore, it is conceivable for the housing to have flat parts inserted into the frame. Said flat parts are preferably produced from a metal or a plastic.

The housing is preferably thermally insulated and/or soundproofed.

The line particularly preferably has at least one switch cabinet for receiving electric devices for operating the line, the switch cabinet being arranged outside the interior of the housing.

On the outside of or outside the interior comprises, within the context of the invention, the part of the production hall that is not part of the interior of the housing or not part of the housing.

It is conceivable for the housing to have feedthroughs for feeding in and/or conducting away, for example, electric lines, compressed air, heat, cold, gases, coolants, water or light into and/or from the interior. Said feedthroughs are configured in particular in such a manner that the housing is closed off from the production hall prior to, during and after the feeding-in and/or conducting-away operation.

Advantageous refinements and developments of the invention can be gathered from the description with reference to the drawings.

According to a preferred embodiment of the present invention, it is provided that the line has a device for cleaning in situ. Cleaning in situ permits the cleaning of line surfaces that are in contact with the food without removing parts of the line. The device for cleaning in situ carries out the cleaning in an automated manner. The housing means that, during the cleaning, further lines in the same production hall are not affected. It is conceivable for the device for cleaning in situ to have cleaning agent containers, nozzles and lines. It is furthermore conceivable for the device for cleaning in situ to be connected to a water supply by a housing feedthrough. Furthermore, it is conceivable for the device for cleaning in situ to be operable with the operating unit.

According to a preferred further embodiment of the present invention, it is provided that the line has a cooling device for cooling the interior of the housing. It is therefore possible in an advantageous manner to cool the interior of the housing to a temperature at which the food can be processed and packaged as prescribed or as desired.

It is conceivable for air to be circulated in the interior for the uniform cooling of the interior. It is furthermore conceivable for the interior to have a device for reducing and/or increasing the air humidity in the interior.

The cooling device preferably has a cooling unit, for example a compressor for cooling a cooling liquid; the cooling unit is particularly preferably arranged outside the interior.

It is conceivable for the cooling device to be arranged outside the housing. For this purpose, it is conceivable for the line to have a refrigeration line for conducting cooled air from the cooling device into the interior through a feedthrough in the housing.

According to a preferred further embodiment of the present invention, it is provided that the interior is flooded with an inert gas. This enables the low-reaction processing and packaging of the food.

It is conceivable for the line to have a gas reservoir for this purpose. The gas reservoir is preferably positioned outside the interior of the housing and is connected to the interior of the housing via a feedthrough in the housing. The gas reservoir may be, for example, a gas supply line from a gas pipeline network of the production hall. However, it is also conceivable for the gas reservoir to be a device for reducing oxygen from the ambient air. Furthermore, it is conceivable for the gas reservoir to have a valve for controlling the gas flow into the interior of the housing. Furthermore, it is conceivable for the line in the interior to have a device for circulating the inert gas.

However, it is also conceivable for the line to have a device for reducing the atmospheric pressure in the interior. This may be, for example, a vacuum pump which is arranged outside the housing and sucks gas out of the interior through a feedthrough.

Furthermore, it is conceivable for the line to have a device for increasing the atmospheric pressure in the interior. For example, advantageously higher cooking temperatures can thus be achieved.

According to a preferred further embodiment of the present invention, it is provided that the line has an operating unit outside the housing. With the operating unit, it is advantageously possible to operate the processing station and/or the packaging station from the outside. It is conceivable for each device of the line to have an operating unit. It is also conceivable for a plurality of devices of the line to be operated via one operating unit. It is conceivable, for example, for the processing station to be operated with one operating unit and for the packaging station to be operated with a further operating unit.

However, the line preferably has one operating unit for operating all of the line components to be operated, in particular for operating the processing station and the packaging station.

It is conceivable for the operating unit to be fastened to a movable arm. Furthermore, it is conceivable for the operating unit to have a touch-sensitive display panel.

The operating unit is preferably movable along the main direction of extent of the line. This makes it possible for a user of the line to be able to displace the operating unit along the line. It is also conceivable for the distance of the operating unit from the floor of the production hall to be adjustable. Furthermore, it is conceivable for the operating unit to be connected wirelessly to the line. For this purpose, it is conceivable for the operating unit to be connected to the line via a Bluetooth, WLAN or NFC connection. The operating unit which is connected wirelessly to the line is preferably physically detached from the line.

It is conceivable for the operating unit to be, for example, a tablet computer.

According to a preferred further embodiment of the present invention, it is provided that the housing is at least partially transparent. This permits the rapid visual inspection of the processing station and of the packaging station from outside the housing.

It is conceivable for the interior of the housing to have lighting. It is conceivable for the lighting to be permanently switched on during operation of the line. It is furthermore conceivable for the lighting to be able to be switched on via the operating unit. However, it is also conceivable for the lighting to reproduce information about the operating state of the line. For this purpose, the lighting could differ in colors. It is also conceivable for a control light for reproducing information about the operating state of the line to be attached to the outside of the housing. Furthermore, it is conceivable for the control light to be configured for lighting and/or flashing in different colors. Preferably, a red light indicates a defective operating state of the line.

It is preferably provided that the housing has at least one window and/or at least one door. This makes it possible in an advantageous manner, for example for maintenance, repair or cleaning purposes, to easily reach the line and in particular the processing station and/or the packaging station. Owing to the housing providing mechanical protection of the environment against contact with parts of the processing station and/or the packaging station, protective cladding can be dispensed with. A window which can be opened and/or a door which can be opened in the housing provides substantially easier access to parts of the processing station and/or of the packaging station than the removal of protective cladding.

The door and/or the window preferably has a door closer and/or a shock absorber and/or a holding unit for fixing the door or the window in a closed position and/or an open position.

It is conceivable for the door and/or the window to be thermally insulated. Furthermore, it is conceivable for the door and/or the window to be soundproofed. Furthermore, it is conceivable for the door and/or the window to be secured against unauthorized opening. Lockable handles on the window and/or on the door are conceivable for this purpose.

Furthermore, it is conceivable that, in a further particularly preferred embodiment, the housing has flaps instead of or in addition to the windows and/or doors, wherein the flaps can have all of the above-described features of the windows and/or doors.

It is preferably provided that the window has a safety switch for recording an opening operation of the window and/or the door has a safety switch for recording an opening operation of the door. This enables an emergency shutdown, an alarm or moving of the line into a position of safety in the event of unauthorized opening of the window and/or the door.

According to a preferred further embodiment of the present invention, it is provided that the line has an airlock for the inward and/or outward transfer of food.

It is conceivable for the airlock to have a first door, an airlock chamber and a second door. Furthermore, it is conceivable for the first door, the airlock chamber and the second door to be configured in such a manner that, for the inward transfer into the interior, first of all the first door, then the airlock chamber and subsequently the second door have to be passed through. For this purpose, the first door and the second door are configured in such a manner that, in a normal operating state, the first door and the second door are not opened simultaneously at any point.

Furthermore, it is conceivable for the airlock chamber to have a feedthrough for feeding in and/or conducting away, for example, gas, cold or heat.

Furthermore, it is conceivable for the airlock chamber to have an airlock table for the automated inward and/or outward transfer. It is conceivable for the airlock table to be configured in such a manner that, for the inward transfer after the first door is closed and the second door is opened, the airlock table moves into the interior to an inward transfer position, and, for the outward transfer, with the second door open, moves from an outward transfer position in the interior into the airlock chamber.

It is conceivable for the line to have an airlock for the inward transfer and an airlock for the outward transfer. However, it is also conceivable for the line to have further airlocks.

According to a preferred further embodiment of the present invention, it is provided that the line has a UV radiator for irradiating the interior of the housing. A treatment for reducing a germ count of the interior and/or of the surfaces of the line in the interior is thus possible in an advantageous manner. It is conceivable for the housing to be impermeable to UV rays.

According to a preferred further embodiment of the present invention, it is provided that the line has an air-exchange device. This permits, for example, the conducting away of cooking vapors from the line.

It is conceivable for a feedthrough of the housing to be part of the air-exchange device. Furthermore, it is conceivable for the flow to be able to pass through the air-exchange device only in one direction. For this purpose, the air-exchange device could have, for example, a nonreturn valve. It is also conceivable for the air-exchange device to be connected to an air extractor. The air-exchange device preferably has filters and/or heat exchangers.

According to a preferred further embodiment of the present invention, it is provided that the processing station has a slicing device, preferably a high performance slicer, and/or a sorting device. The sorting device is preferably a device for sorting, combining, lining up and/or shingling the food slices into individual portions and/or combined portions and/or into format sets.

A further subject matter of the present invention is a supply device for supplying food to a line, wherein the supply device is suitable for conveying food from the outside into the interior of the housing to the processing station while maintaining the housing of the processing station and of the packaging station.

This advantageously permits the supply, for example, of blocks of food for slicing in the line.

According to a preferred embodiment of the present invention, it is provided that the supply device has an airlock. Food can be introduced into the interior of the line through the airlock. It is conceivable for the airlock to have an airlock chamber. Furthermore, it is conceivable for the food to be cooled or heated in the airlock chamber and/or for an inert gas to flow around the food. Furthermore, it is conceivable for the atmospheric pressure to be adapted in the airlock chamber to the atmospheric pressure in the interior of the housing.

According to a preferred further embodiment of the present invention, it is provided that the supply device is suitable for automated conveying. This facilitates work with the machine and leads to fewer errors and to greater operating safety.

A further subject matter of the present invention is a receiving device for receiving packaged food from a line, wherein the receiving device is suitable for conveying food from the interior of the housing to the outside while maintaining the housing of the processing station and of the packaging station.

This makes it possible in an advantageous manner to receive packaged food for further processing or for transferring outside the line.

According to a preferred embodiment of the present invention, it is provided that the receiving device has an airlock. Food can be conducted out of the interior of the line through the airlock. It is conceivable for the airlock to have an airlock chamber. Furthermore, it is conceivable for the atmospheric pressure to be adapted in the airlock chamber to the atmospheric pressure outside the interior of the housing.

According to a preferred further embodiment of the present invention, it is provided that the receiving device is suitable for conveying a trolley. This makes it possible to effectively discharge large quantities of packaged food.

According to a preferred further embodiment of the invention, it is provided that the receiving device is suitable for automated conveying. This facilitates work with the machine and leads to fewer errors and higher operating safety.

A further subject matter of the present invention is a method for operating a line for processing and packaging food, wherein, prior to the processing and packaging, the food is inwardly transferred into a housing of the line, wherein the food is processed and packaged inside the housing, and wherein the food is outwardly transferred out of the housing after the processing and packaging.

The method according to the invention permits a changed cooling and hygiene concept. By processing and packaging within the housing it is possible for only the interior of the housing to be kept at a temperature which is not harmful for the food being processed.

Furthermore, the housing permits the hygienic separation between a—small—region having high hygienic requirements, i.e. the interior of the housing, and a region having lower hygienic requirements, i.e. the production hall outside the housing.

It is conceivable for a line be used as the line. Furthermore, it is conceivable for the food to be transferred inward with a supply device. Furthermore, it is conceivable for the food to be outwardly transferred with a receiving device.

According to a preferred embodiment of the present invention, it is provided that an interior of the housing is cooled. It is therefore possible in an advantageous manner to cool the interior of the housing to a temperature at which the food can be processed and packaged as prescribed or as desired.

According to a preferred further embodiment of the present invention, it is provided that the food is processed and packaged under a protective atmosphere. This permits the low-reaction processing and packaging of the food.

All of the statements above under "Disclosure of the invention" apply equally to the line according to the invention, the supply device according to the invention, the receiving device according to the invention and the method according to the invention.

Further details, features and advantages of the invention emerge from the drawing and from the description below of preferred embodiments with reference to the drawing. The drawing here merely illustrates exemplary embodiments of the invention that do not restrict the essential inventive concept.

BRIEF DESCRIPTION OF THE DRAWING

FIG. 1 shows a highly simplified, schematic illustration of the line according to an exemplary embodiment of the present invention.

DETAILED DESCRIPTION

In the FIGURE, identical parts are always provided with the same reference signs and will therefore generally also only be named or mentioned once in each case.

FIG. 1 illustrates a highly simplified, schematic illustration of the line 1 according to an exemplary embodiment of the present invention. The line 1 has the processing station 3 and the packaging station 4. The processing station 3 itself has the slicing device 3a, for example a high performance slicer, and the sorting device 3b for producing format sets. The processing station 3 and the packaging station 4 are housed by the housing 2, that is to say, they are located in the interior of the housing 2 and the interior of the housing 2 is separated from the rest of the production hall 10 by the housing 2. The housing 2 is soundproofed and thermally insulated.

The operating unit 5 is positioned on the pivotable arm 5a. All of the components of the line 1, such as, for example, the slicing device 3a, the sorting device 3b or the packaging station 4, can be controlled with the operating unit 5. Furthermore, the line 1 has the cooling device 6. The cooling device 6 cools air to, for example, 2° C. and conducts the air by means of the thermally insulated cooling line 6a through the feedthrough 7 into the interior of the housing 2. The interior of the housing 2 is thereby cooled. The housing 2 has a respective airlock 8 on two sides. Said airlocks 8 serve to introduce food into the interior of the housing 2 and at the same time to hold up the housing of the processing station 3 and of the packaging station 4. On the side of the processing station 3 (on the right in the FIGURE), the line 1 has the supply device 100 with which blocks of food can be brought in an automated manner through the airlock 8 into the interior of the housing 2 to the processing station 3. On the side of the packaging station 4 (on the left in the FIGURE), the line 1 has the receiving device 101 which can receive packaged food from the interior of the housing 2 through the airlock 8.

During the operation of the line 1, blocks of food are inwardly transferred in an automated manner by the supply device 100 through the airlock 8 into the interior of the housing 2. The blocks of food are positioned by the supply device 100 through a first door (not shown) of the airlock on an airlock table (not shown) in the airlock chamber (not shown). As soon as the first door is closed, the airlock chamber is evacuated, is filled with inert gas and cooled to 2° C. The second door (not shown) is then opened from the airlock chamber into the interior of the housing 2. The airlock table moves the blocks of food to the slicing device 3a and positions them for slicing in the slicing device 3a.

In the slicing device 3a, the blocks of food are sliced into food slices and subsequently transported to the sorting device 3b. The sorting device 3b orders the food slices into format sets. Subsequently, the format sets are transported onto the packaging station 4. In the packaging station 4, the food is finally packaged and temporarily stored in a trolley (not shown). If the trolley is full, the trolley is outwardly transferred through the airlock 8 to the receiving device.

The food is processed and the food is packaged in the interior of the housing 2. The interior of the housing 2 is cooled and flooded with an inert gas.

LIST OF REFERENCE SIGNS

1 Line
2 Housing
21 Housing frame
22 Window
3 Processing station
3a Slicing device
3b Sorting device
4 Packaging station
5 Operating unit
5a Arm
6 Cooling device
6a Cooling line
7 Feedthrough
8 Lock
10 Production Hall
100 Supply device
101 Receiving device

The invention claimed is:

1. A line for processing and packaging food in a production hall, the line comprising:
    at least one processing station for processing the food; and
    at least one packaging station for packaging the processed food,
    wherein the at least one processing station and the at least one packaging station are housed in an interior of a common housing that is located in the production hall,
    wherein the line has a cooling device for cooling the interior of the common housing, the line has an operating unit located outside of the common housing, the operating unit is configured to operate the at least one processing station and/or the at least one packaging station from outside of the common housing, and the line has a device for cleaning in place, and
    wherein the common housing comprises an airlock comprising an airlock chamber, and the food inside of the airlock chamber is cooled by the cooling device to a temperature generally equivalent to a temperature in the interior of the common housing.

2. The line as claimed in claim 1, wherein the interior is flooded with an inert gas.

3. The line as claimed in claim 1, wherein the common housing is at least partially transparent.

4. The line as claimed in claim 1, wherein the food is transferred in and out of the interior of the common housing through the airlock.

5. The line as claimed in claim 1, wherein the line has an air-exchange device.

6. The line as claimed in claim 1, wherein the at least one processing station has a slicing device and/or a sorting device.

7. A supply device for supplying the food to the line as claimed in claim 1, wherein the supply device is configured for conveying the food from an outside into the interior of the common housing to the at least one processing station.

8. The supply device as claimed in claim 7, wherein the supply device has an airlock and/or the supply device is configured for automated conveying of the food into and/or from the interior of the common housing.

9. A receiving device for receiving the packaged food from the line as claimed in claim 1, wherein the receiving device is configured for conveying the food from the interior of the common housing to an outside.

10. The receiving device as claimed in claim 9, wherein the receiving device has an airlock and/or the receiving device is configured for conveying a trolley and/or the receiving device is configured for automated conveying of the food into and/or from the interior of the common housing.

11. The line as claimed in claim 1, wherein the common housing comprises a frame, the common housing is at least partially transparent, and the interior of the common housing is closed off in a gas-tight manner from an interior of the production hall.

12. The line as claimed in claim 11, wherein the common housing comprises at least one window and/or at least one door, the operating unit is positioned on a pivotable arm, and wherein the common housing has one or more flat parts inserted into the frame.

13. The line as claimed in claim 12, wherein the at least one window comprises a safety switch for recording an opening operation of the at least one window and/or the at least one door comprises a safety switch for recording an opening operation of the at least one door, and
wherein the cooling device cools air and conducts the air by means of a thermally insulated cooling line through a feedthrough into the interior of the common housing to cool the interior of the common housing.

14. The line as claimed in claim 13, wherein the common housing is thermally insulated and soundproof, the interior of the common housing comprises lighting, the line comprises an air exchange device for conducting away cooking vapors from the line.

15. The line as claimed in claim 1, wherein the line has a UV radiator for irradiating the interior of the common housing.

16. The line as claimed in claim 1, wherein the operating unit is supported on a movable arm.

17. The line as claimed in claim 16, wherein the operating unit is connected wirelessly to the line.

18. The line as claimed in claim 1, wherein the line comprises a switch cabinet arranged outside of the common housing for operating the line.

19. The line as claimed in claim 1, wherein the interior of the common housing comprises a light, and the light is enabled to reproduce information about an operating state of the line.

20. The line as claimed in claim 1, wherein the common housing comprises a door and/or window that are secured against unauthorized opening,
wherein the window has a safety switch for recording an opening operation of the window and/or the door has a safety switch for recording an opening operation of the door.

21. A method for operating a line for processing and packaging food in a production hall, wherein, prior to the processing and the packaging, the food is inwardly transferred into a common housing of the line, the common housing is located in the production hall and comprises at least one processing station for the processing of the food and at least one packaging station for the packaging of the food, wherein the processing and the packaging takes place within the interior of the common housing, and wherein the food is outwardly transferred out of the common housing after the processing and the packaging, wherein the line has a cooling device for cooling the interior of the common housing, the line has an operating unit outside of the common housing, and the method comprises operating the at least one processing station and/or the at least one packaging station from outside of the common housing with the operating unit, and wherein the common housing comprises an airlock comprising an airlock chamber, and the food inside of the airlock chamber is cooled by the cooling device to a temperature generally equivalent to a temperature in the interior of the common housing.

22. The method as claimed in claim 21, wherein the processing and the packaging of the food is under a protective atmosphere.

23. A line for processing and packaging food in a production hall, the line comprising:
at least one processing station for processing the food, and
at least one packaging station for packaging the processed food,
wherein the at least one processing station and the at least one packaging station are housed in an interior of a common housing that is located in the production hall, the common housing is closed off from the production hall in a gas and liquid-tight manner, is at least partially transparent, and comprises a door and/or window that are secured against unauthorized opening,
wherein the line has a cooling device for cooling the interior of the common housing, the line has an operating unit located outside of the common housing, the operating unit is configured for operating the at least one processing station and/or the at least one packaging station from outside of the common housing, the operating unit is supported on a movable arm and has a touch-sensitive display panel, the operating unit is moveable relative to the line,
wherein the line comprises at least one switch cabinet for electric devices for operating the line, the switch cabinet is arranged outside of the interior of the common housing,
wherein the common housing comprises an airlock comprising an air lock chamber, and the food inside of the airlock chamber is cooled by the cooling device to a temperature generally equivalent to a temperature of the interior of the common housing before the food is moved to the at least one processing station.

* * * * *